US009101786B2

(12) United States Patent
Cavaliere et al.

(10) Patent No.: US 9,101,786 B2
(45) Date of Patent: Aug. 11, 2015

(54) CABLE CONNECTOR FOR USE WITH A ROTATING CONNECTION

(71) Applicants: Mark Cavaliere, Pittsburgh, PA (US); Christopher L. Prete, Cranberry Township, PA (US)

(72) Inventors: Mark Cavaliere, Pittsburgh, PA (US); Christopher L. Prete, Cranberry Township, PA (US)

(73) Assignee: MSA TECHNOLOGY, LLC, Cranberry Township, PA (US)

(*) Notice: Subject to any disclaimer, the term of this patent is extended or adjusted under 35 U.S.C. 154(b) by 471 days.

(21) Appl. No.: 13/652,658

(22) Filed: Oct. 16, 2012

(65) Prior Publication Data

US 2014/0102453 A1 Apr. 17, 2014

(51) Int. Cl.

| | |
|---|---|
| ***A62B 18/02*** | (2006.01) |
| ***H01R 4/60*** | (2006.01) |
| ***A62B 7/00*** | (2006.01) |
| ***H01R 13/00*** | (2006.01) |
| ***A62B 18/08*** | (2006.01) |
| *A62B 9/04* | (2006.01) |
| *H01R 4/64* | (2006.01) |
| *F16K 31/02* | (2006.01) |
| *A62B 7/02* | (2006.01) |

(52) U.S. Cl.

CPC . *A62B 9/04* (2013.01); *A62B 18/08* (2013.01); *H01R 13/005* (2013.01); *A62B 7/02* (2013.01); *A62B 18/02* (2013.01)

(58) Field of Classification Search

USPC ............. 128/201.27, 200.24, 204.22, 204.26, 128/205.22, 202.22, 203.13, 202.14, 128/204.18, 204.21, 204.23, 128/201.22–202.11, 202.19, 205.24, 128/205.25, 206.12, 206.21; 439/199; 138/109; 600/529; 405/186, 185, 187; 285/273, 272

See application file for complete search history.

(56) References Cited

U.S. PATENT DOCUMENTS

| | | | | |
|---|---|---|---|---|
| 3,012,801 | A * | 12/1961 | Cole | 403/52 |
| 3,026,129 | A * | 3/1962 | Courtot et al. | 285/184 |
| 4,643,462 | A * | 2/1987 | Wallace | 285/119 |
| 4,821,767 | A | 4/1989 | Jackson | |
| 5,016,627 | A | 5/1991 | Dahrendorf | |
| 6,361,237 | B1 * | 3/2002 | Salmela | 403/81 |
| 7,261,104 | B2 | 8/2007 | Kiefer | |
| 2004/0100092 | A1 * | 5/2004 | Sranka | 285/121.3 |

(Continued)

FOREIGN PATENT DOCUMENTS

| | | | |
|---|---|---|---|
| WO | WO2011129491 A1 | 10/2011 |
| WO | WO2014062640 | 4/2014 |

*Primary Examiner* — Tan-Uyen (Jackie) T Ho
*Assistant Examiner* — Mark Wardas
(74) *Attorney, Agent, or Firm* — Bartony & Associates, LLC

(57) ABSTRACT

A respirator system includes a regulator for use in connection with a facepiece of the respirator system. The regulator includes an interface. The respirator system further includes a hose assembly including a hose for carrying breathing gas to the regulator and a cable for carrying at least one electrical wire to the regulator. The respirator system also includes a connector system. The connector system includes a base operatively connectible to the interface of the regulator. The base includes a channel to seat at least a portion of the cable. The channel is in operative connection with an interior of the regulator upon connection of the base to the interface. The connector system also includes a rotatable member which is rotatable relative to the base. The cable is in operative connection with the rotatable member so that a bend in the cable travels along the length of the cable and a varying length of the cable is positioned within the channel depending upon the rotational position of the rotating member relative to the base.

10 Claims, 7 Drawing Sheets

(56) References Cited

U.S. PATENT DOCUMENTS

| | | | |
|---|---|---|---|
| 2005/0016540 | A1 | 1/2005 | Jumpertz |
| 2010/0236554 | A1 | 9/2010 | Prete |
| 2012/0000465 | A1 | 1/2012 | Cavaliere |
| 2012/0152253 | A1 | 6/2012 | Leuschner |
| 2012/0160245 | A1 | 6/2012 | Leuschner |

* cited by examiner

CABLE CONNECTOR FOR USE WITH A ROTATING CONNECTION

BACKGROUND

The following information is provided to assist the reader to understand the technologies disclosed below and the environment in which such technologies will typically be used. The terms used herein are not intended to be limited to any particular narrow interpretation unless clearly stated otherwise in this document. References set forth herein may facilitate understanding of the technologies or the background thereof The disclosure of all references cited herein are incorporated by reference.

A supplied-air respirator system such as self-contained breathing apparatus (SCBA) permits a person to breath in hazardous environments such as fires and confined spaces where breathing would be difficult or impossible without mechanical aid. A supplied-air respirator can, for example, include a full facepiece, a harness and carrier assembly, an air cylinder full of high pressure compressed air for breathing and at least one, and more typically two, air-pressure regulators. The first or first-stage regulator is typically mounted near the air cylinder and functions to reduce the relatively high pressure of the compressed air from the air cylinder to above atmospheric pressure. The air cylinder typically contains air or gas under high pressure (for example, 2200 psi to 4500 psi). The first stage regulator can, for example, reduce the pressure to about 80-100 psi. The second or second-stage regulator is typically mounted on the facepiece and functions to adjust the flow of air to meet the respiratory needs of the user. Respiration-controlled regulator assemblies are disclosed, for example, in U.S. Pat. Nos. 4,821,767 and 5,016,627 and U.S. Patent Application Publication No. 2012/016,0245.

The facepiece or face mask, which is sealed to the face of the user, typically includes a lens through which the user can view the surrounding environment. The facepiece also includes a port or mount for fluid connection with the second-stage regulator through which inspired air passes into the face mask and an exhalation port through which expired air passes out of the mask. The user's respiration controls a valve system (for example, including an inhalation valve and an exhalation valve) to control delivery of pressurized air via the second-stage regulator. Often, it is desirable to maintain a slight positive pressure within the facepiece relative to ambient pressure. Facepieces for supplied-air respirators in which a positive pressure is maintained within the facepiece are often referred to as pressure demand facepieces, while other facepieces for supplied-air respirators are often referred to as demand facepieces.

SCBAs typically utilize a hose to supply air from the first stage regulator to the facepiece through the second stage regulator. In some SCBAs, an electrical cable is used to provide electrical power to the facepiece. In a number of SCBA systems, the cable is routed to the facepiece along with the air hose. Movement of the SCBA on the user results in twisting, pulling, and significant straining of the cable. Such straining of the cable can result in damage to the cable, increasing the potential for malfunction or failure of the electronics on the facepiece. Moreover, the cable can be exposed to the external environment and presents a risk of snagging or catching on obstacles, which can damage the cable or create a condition for the user and the SCBA to become entangled.

SUMMARY

In one aspect, a respirator system includes a regulator for use in connection with a facepiece of the respirator system.

The regulator includes an interface. The respirator system further includes a hose assembly including a hose for carrying breathing gas to the regulator and a cable for carrying at least one electrical wire to the regulator. The respirator system also includes a connector system. The connector system includes a base operatively connectible to the interface of the regulator. The base includes a channel to seat at least a portion of the cable. The channel is in operative connection with an interior of the regulator upon connection of the base to the interface. The connector system also includes a rotatable member which is rotatable relative to the base. The cable is in operative connection with the rotatable member so that a bend in the cable travels along the length of the cable and a varying length of the cable is positioned within the channel depending upon the rotational position of the rotating member relative to the base.

The regulator may, for example, include a shaft extending from the interface. The shaft may, for example, include a passage therein via which breathing gas can enter the regulator. In such an embodiment, the base may, for example, include a passage through which the shaft passes, and the rotatable member may, for example, include a passage through which the shaft passes so that the rotatable member is rotatable about an axis of the shaft to rotate relative to the base. The rotating member may, for example, include a port adapted to be placed in fluid connection with the hose and adapted to be placed in fluid connection with at least one port formed in the shaft to place the hose in fluid connection with the passage in the shaft.

In a number of embodiments, the connector system further includes a cover attachable to the rotating member to encompass the cable. The cable may, for example, be fixed to the rotatable member and travels around at least a portion of a member such as a generally cylindrical member of the rotatable member. The passage of the rotatable member through which the shaft passes may be formed in the generally cylindrical member. The cover is adapted to constrain movement of the cable. The cable may, for example, be held in an arced conformation around the at least a portion of the rotating member by the cover. In a number of embodiments, the rotating member includes a flange extending outwardly over at least a portion thereof to constrain movement of the cable. The flange may, for example, be positioned between the cable and the channel. In a number of embodiments, he flange does not contact the bend in the cable.

In another aspect, a connector system for connecting a cable to an item includes a base operatively connectible to the item. The base includes a channel to seat at least a portion of the cable. The channel is in operative connection with the item upon connection of the base to the item. The connector system further includes a rotatable member which is rotatable relative to the base. The cable is in operative connection with the rotatable member so that a bend in the cable travels along the length of the cable and a varying length of the cable is positioned within the channel depending upon the rotational position of the rotating member relative to the base.

The connector system may further include a cover attachable to the rotating member to encompass the cable. The cable may, for example, be fixed to the rotatable member and travel around at least a portion of an arced member of the rotatable member. The cover is operable to constrain movement of the cable. The cable may, for example, be held in an arced conformation around the at least a portion of the rotating member by the cover. In a number of embodiments, the rotating member comprises a flange extending outwardly over at least a portion thereof to constrain movement of the cable, the flange being positioned between the cable and the channel. In a number of embodiments, the flange does not contact the bend in the cable.

In a further aspect, a method of managing a cable in a respirator system, wherein the respirator system includes a regulator including an interface, a facepiece and a hose assembly including a hose for carrying breathing gas to the regulator and the cable, and wherein the cable is adapted to carry at least one electrical wire to the regulator, includes connecting a connector system to the interface of the regulator. The connector system includes a base operatively connectible to the interface of the regulator. The base includes a channel to seat at least a portion of the cable. The channel is in operative connection with an interior of the regulator upon connection of the base to the interface. The connector system further includes a rotatable member which is rotatable relative to the base. The method further includes placing the cable in operative connection with the rotatable member so that a bend in the cable travels along the length of the cable and a varying length of the cable is positioned within the channel depending upon the rotational position of the rotating member relative to the base.

The devices, systems and methods hereof, along with the attributes and attendant advantages thereof, will best be appreciated and understood in view of the following detailed description taken in conjunction with the accompanying drawings.

DETAILED DESCRIPTION

As used herein and in the appended claims, the singular forms "a," "an", and "the" include plural references unless the content clearly dictates otherwise. Thus, for example, reference to "a cable" includes a plurality of such cables and equivalents thereof known to those skilled in the art, and so forth, and reference to "the cable" is a reference to one or more such cables and equivalents thereof known to those skilled in the art, and so forth.

The described features, structures, or characteristics of various embodiments hereof may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

Figure 1:
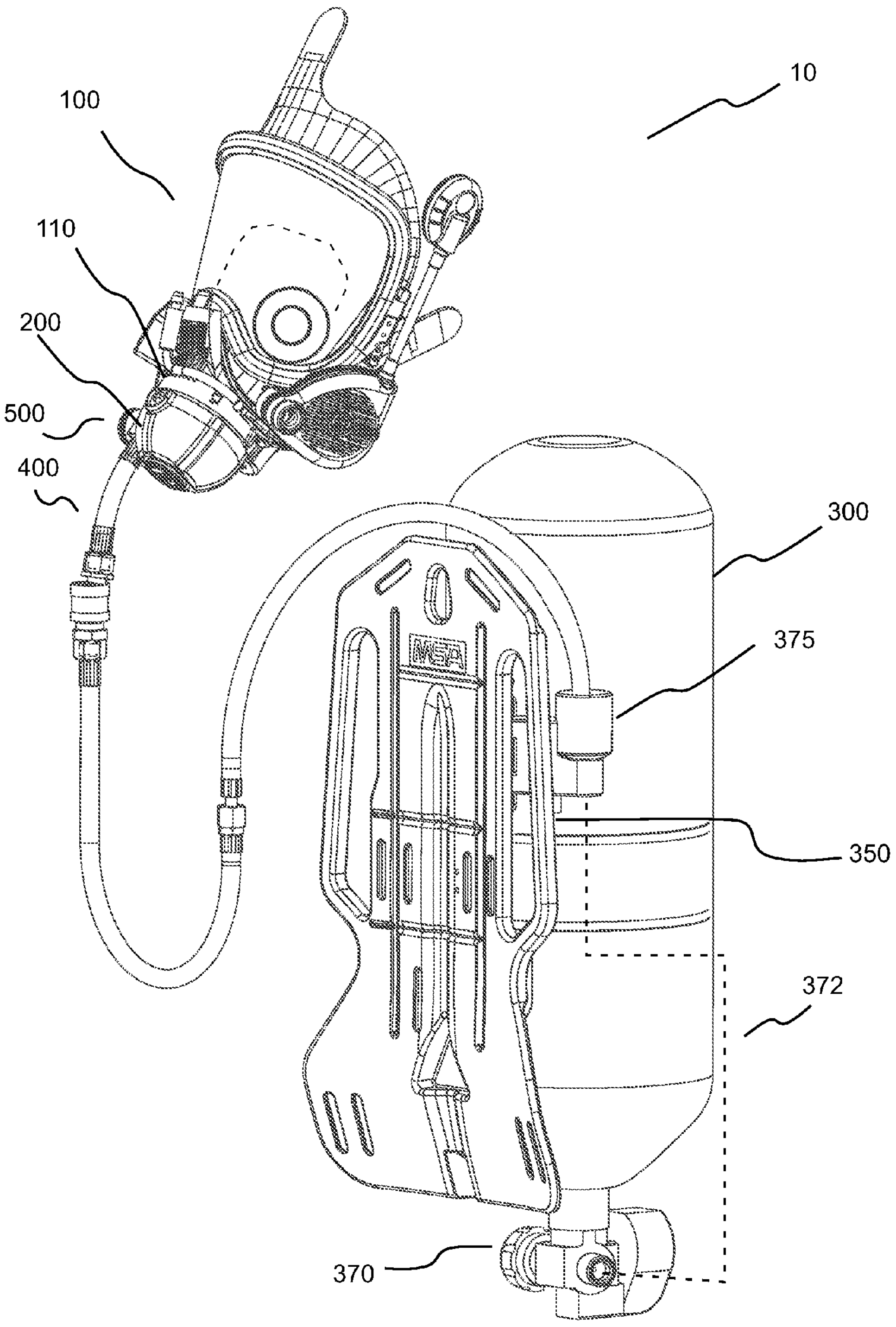
FIG. 1 illustrates a perspective view of a representative respirator system in the form of a self-contained breathing apparatus or SCBA including representative embodiment of a connector system hereof.
Figure 2:
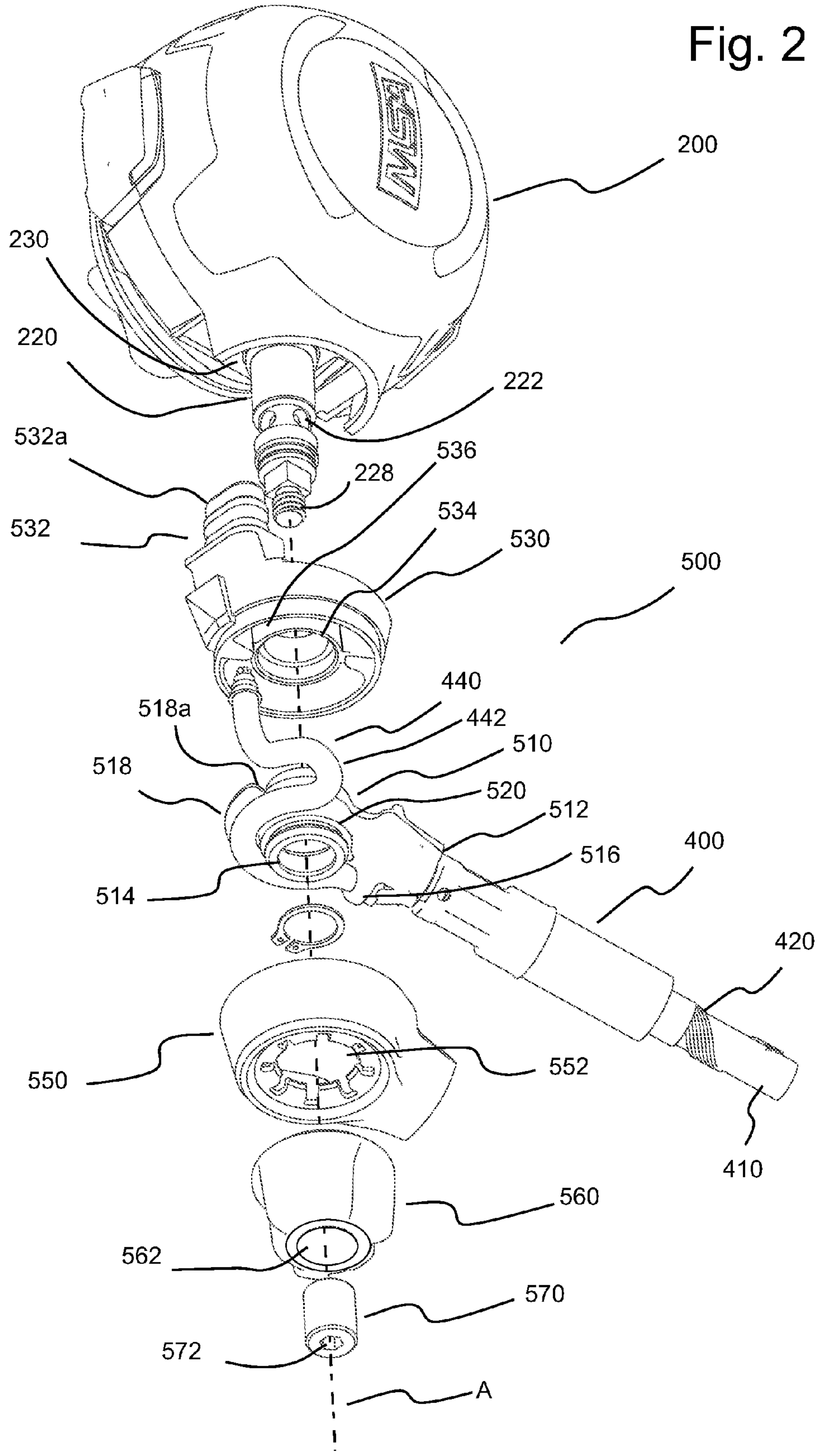
FIG. 2 illustrates a perspective exploded view of the connector system in position to be connected to the second stage regulator.

FIG. 1 illustrates a representative embodiment of a self-contained breathing apparatus (SCBA) system 10. In the illustrated embodiment, system 10 includes a facepiece 100, which includes a mount or interface 110 to connect a second stage pressure regulator assembly 200 so that pressurized air can be supplied from a breathing tank 300 containing pressurized breathing gas (for example, air). Breathing tank 300 is supported on a back plate 350 that is worn by the user of system 10 (via attached harness straps which are not shown in FIG. 1) and includes a valve 370 to provide air to a first stage regulator 375 via, for example, a hose 372, which is represented schematically as a dashed line in FIG. 1. The general construction and operation of a facepiece in a respirator system such as SCBA system 10 is described, for example, in U.S. Pat. No. 7,261,104. First stage regulator 375 of breathing tank 300 is in fluid connection with second stage regulator 200 via a hose assembly or system 400.

FIGS. 2 through 7 illustrate a representative embodiment of a connector assembly or system 500 for operative connection of hose assembly 400 to second stage pressure regulator assembly 200. Hose assembly 400 includes a hose to transport pressurized air or other breathing/oxygen-containing gas to second stage regulator 200. As described above, hose assembly 400 also includes wiring or cabling to carry electrical power to second stage regulator 200 and thereby to the facepiece 100. In the illustrated embodiment, a plurality of electrically insulated conductors or wires 420 are spiraled around hose 410. Near the end of hose 410, wires 420 pass through a length of cable 440. As used herein, the term "cable" refers to a single conductor as well as a plurality of conductors grouped together (for example, within an electrically insulating, flexible conduit).

Connection system 500 is an enclosed modular system which provides freedom for cable 440 and hose 410 to swivel in a manner to provide strain relief to cable 440 (and conductors/wires 420 therein) while simultaneously providing protection from the environment, including protection from snagging or catching on obstacles. Connector system 500 includes a rotatable or swivelable platform or member 510. Hose 410 is attached to a port 512 of rotatable member 510 via which pressurized breathing gas is delivered to ports 222 of an extending shaft or conduit 220 of second stage regulator 200. In that regard, rotatable member 510 includes a passage 514 through which shaft 220 passes to place ports 222 in fluid connection with port 512. Member 510 is rotatable or swivelable over a range of angles to various rotational positions around axis A of shaft 220. Shaft 220 thus provide a path for breathing gas supply into second stage regulator 200 while functioning as an axle around which rotatable member 510 can rotate.

Connection system 500 further includes a plug member or base 530 which connects to a seating or interface 230 in second stage regulator 200. Base 530 includes an extending section 532 through which cable 440 and/or wires 420 extend to the interior of second stage regulator 200. A gasket or other sealing member 532*a* can, for example, be provided in connection with extending section 532 to provide a seal. Base 530 includes a passage 534 through which shaft 220 passes to enter passage 514 of rotatable member 510. Base 530 further includes a channel or seating 536 in connection with extending section 532 into which a portion of cable 440 can be seated.

In the illustrated embodiment, rotatable member 510 includes a first guide 516 in the form of a loop through which cable 440 passes. Rotatable member 510 further includes a second guide or a support 518 in the form of a radially outward extending flange over which cable 440 passes so that cable 440 passes around at least a portion of a section 520, which is, for example, generally cylindrical in shape, of rotatable member 510 through which passage 514 is formed. After passing an edge 518*a* of second guide 518, cable 440 extends in the direction of axis A (see FIG. 2) to enter extending section 532 of base 530. The length of cable 440 is such that a bend or wave 442 is formed in cable 440. As rotatable member 510 rotates or swivels around axis A of shaft 220, a portion of cable 440 in the vicinity of bend 442 is seated or positioned within channel 536 to control motion of cable 440 and provide strain relief.

Figure 3:
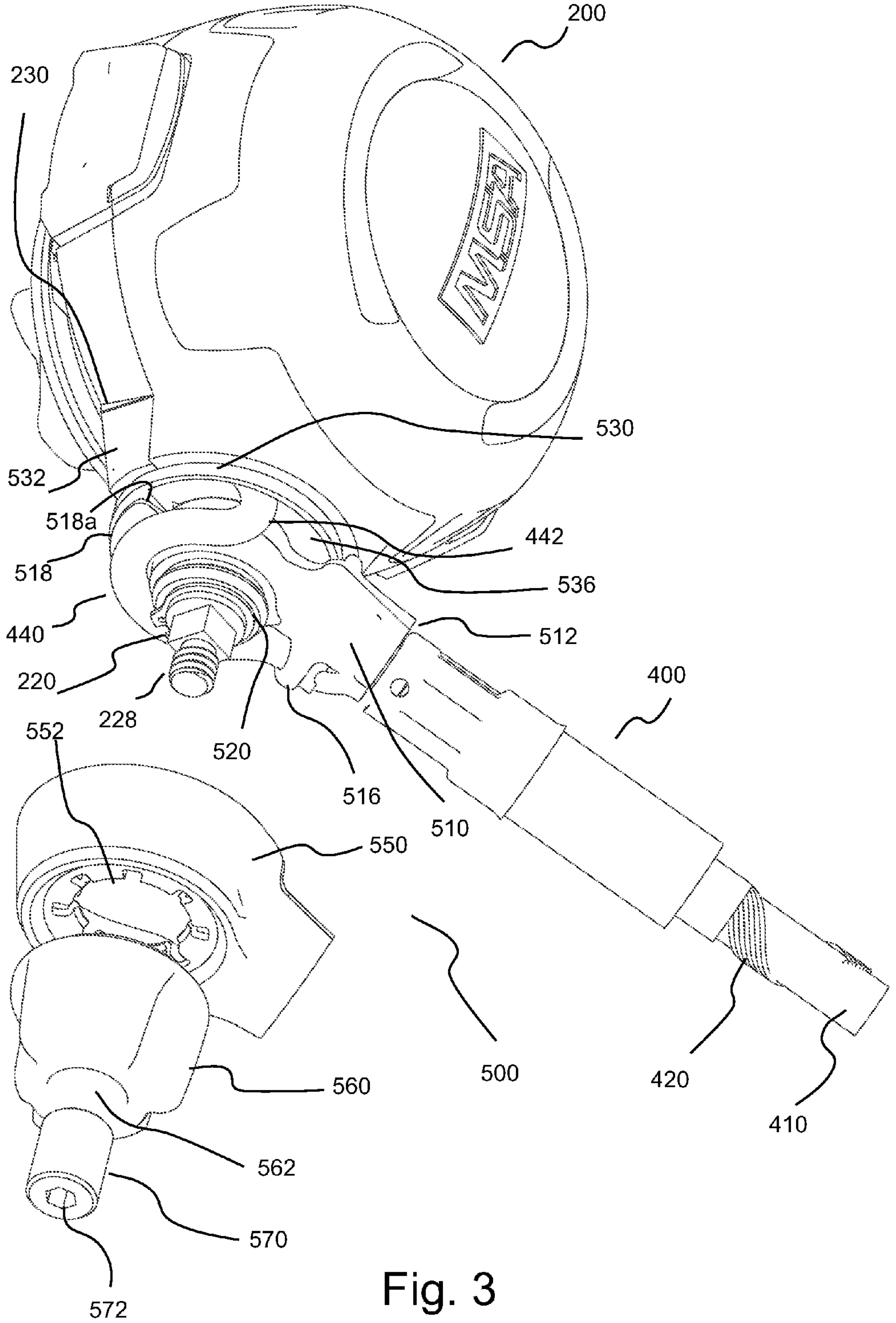
FIG. 3 illustrates a perspective view of the connector system in connection with the second stage regulator with the cover of the connector system removed and the rotating member of the connector system in a first position.
Figure 4:
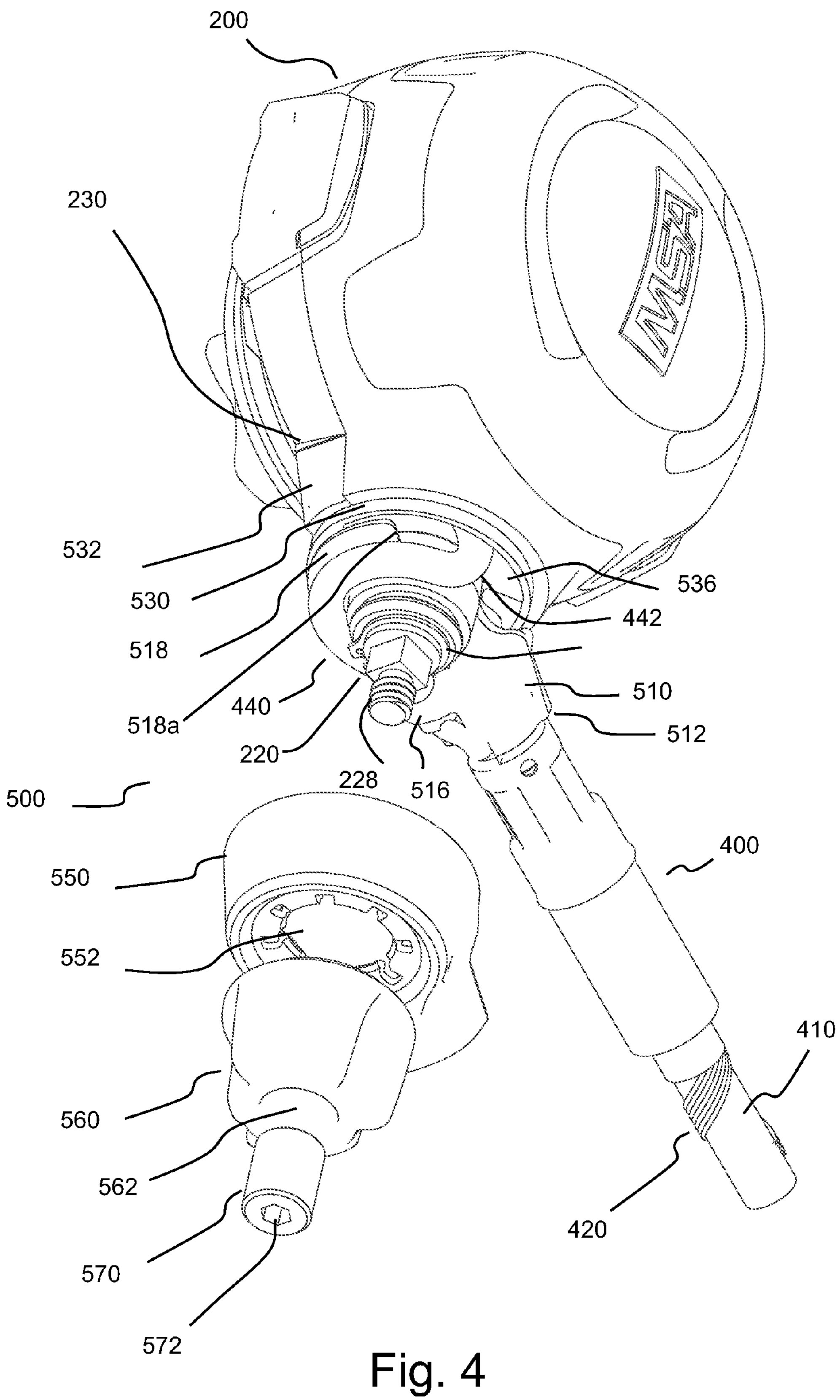
FIG. 4 illustrates a perspective view of the connector system in connection with the second stage regulator with the cover of the connector system removed and the rotatable member of the connector system in a second position (rotated counterclockwise from the first position of FIG. 3).
Figure 5:
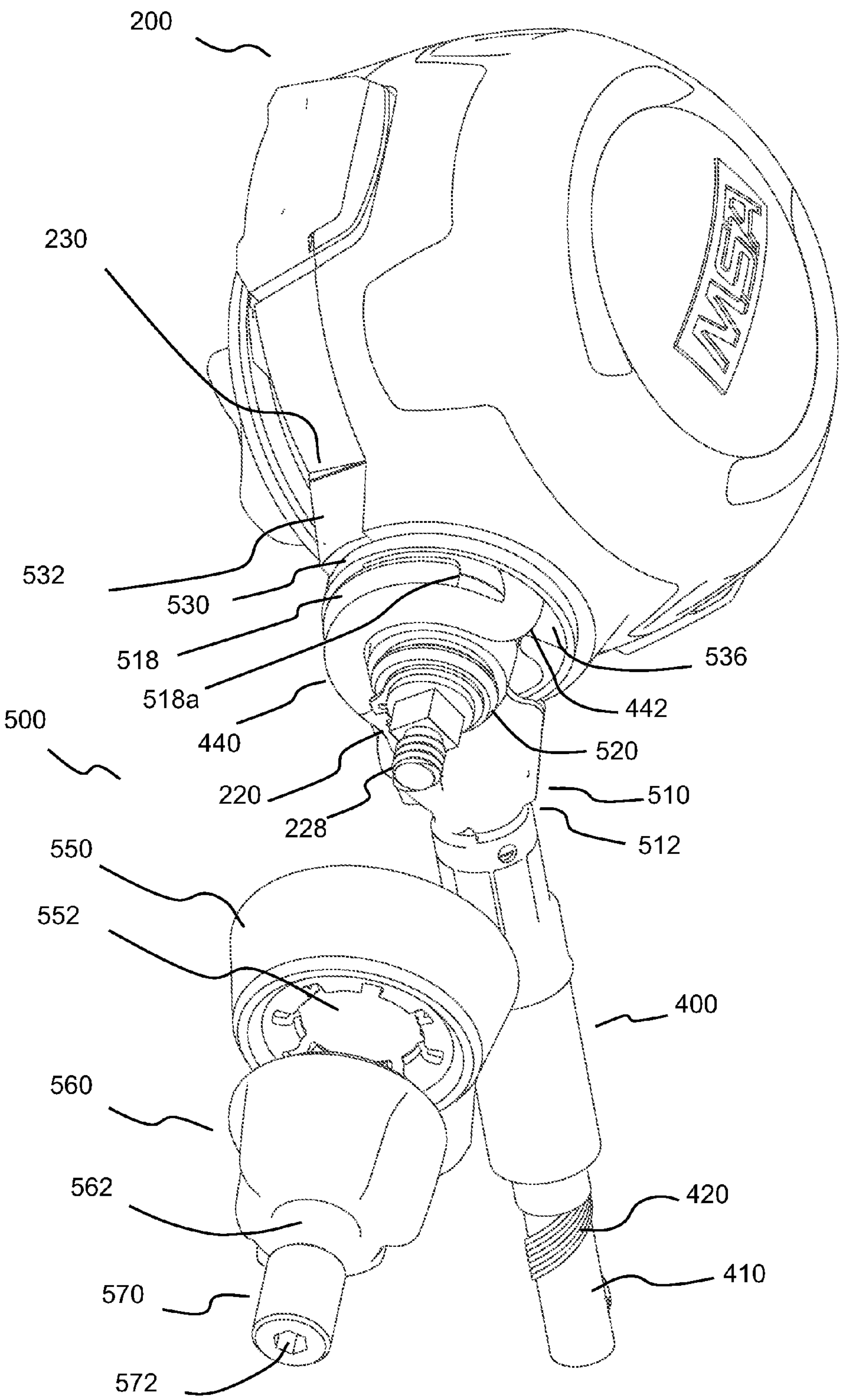
FIG. 5 illustrates a perspective view of the connector system in connection with the second stage regulator with the cover of the connector system removed and the rotatable member of the connector system in a third position (rotated counterclockwise from the second position of FIG. 4).
Figure 6A:
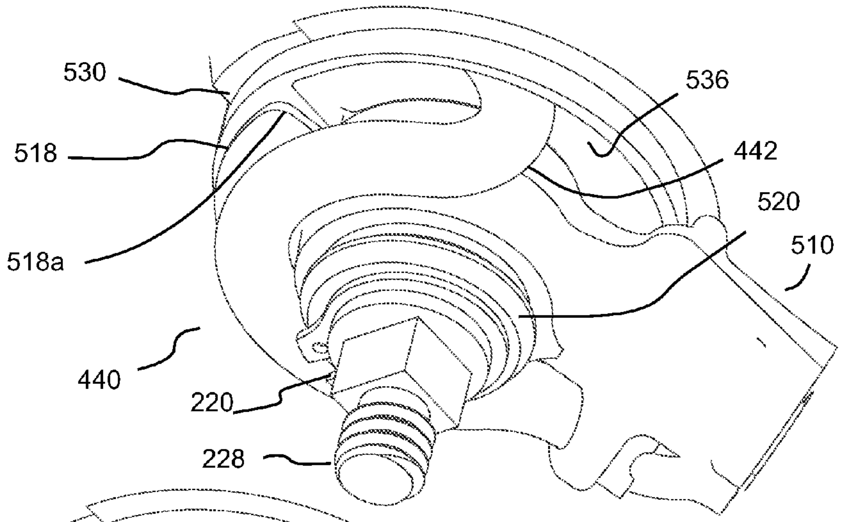
FIG. 6A illustrates an enlarged, perspective view of the rotatable member of the connector system in the first position of FIG. 3.
Figure 6B:
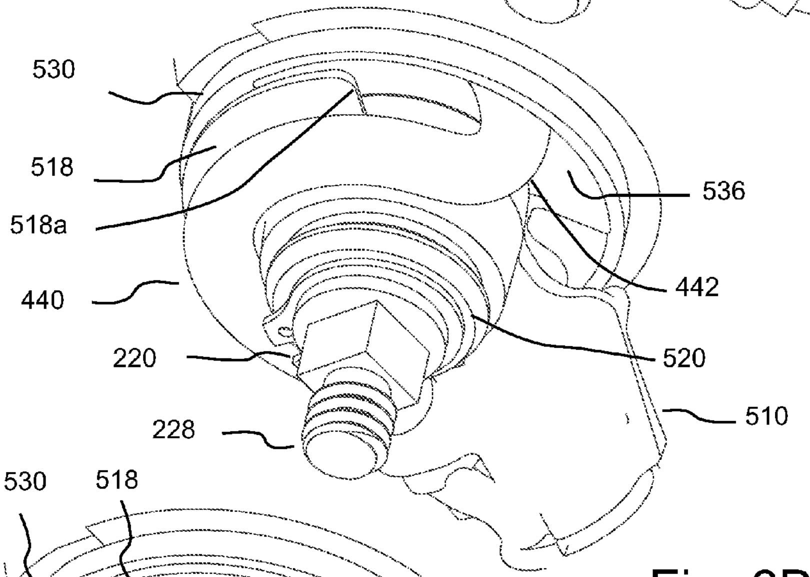
FIG. 6B illustrates an enlarged, perspective view of the rotatable member of the connector system in the second position of FIG. 4.
Figure 6C:
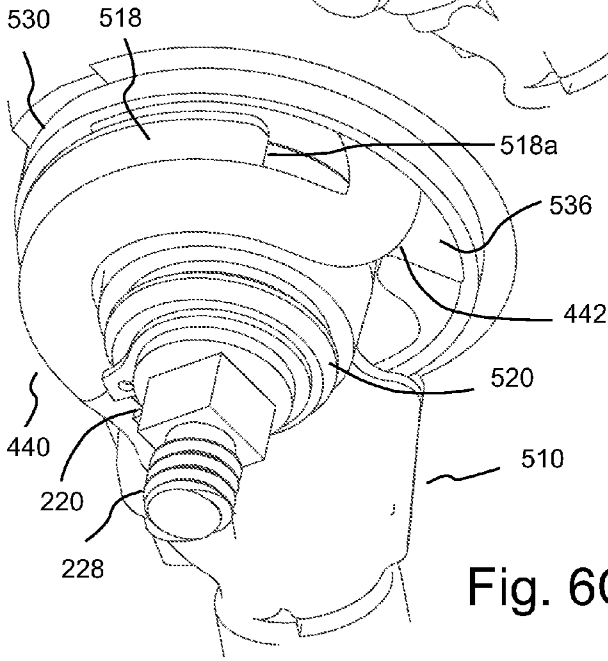
FIG. 6C illustrates an enlarged, perspective view of the rotatable member of the connector system in the third position of FIG. 5.

In that regard, as rotatable member 510 rotates about axis A, the conformation of cable 440 causes bend 442 to travel along the length of cable 440 so a varying length of cable 440 is seated within channel 536 depending upon the position of rotatable member 510 around axis A. FIGS. 3 through 5 illustrate various positions of rotatable member 510 (and hose assembly 400 extending therefrom) around axis A and the effect of the rotation of rotatable member 510 on the position of cable 440 and bend 442. In comparing FIGS. 3 through 5 and FIGS. 6A through 6C, it is seen that as rotatable member 510 is rotated in a clockwise direction (with reference to the orientation of FIGS. 3 through 5), the position of bend 442 (relative to base 530 and second stage regulator 200) travels in a clockwise direction and along the length of cable 440 in the manner of a travelling wave such that more of the length of cable 440 is seated within channel 536. As rotatable member 510 is rotated in the opposite (counterclockwise) direction, bend 442 travels in a counterclockwise direction (relative to base 530 and second stage regulator 200) and along the length of cable 440 in the manner of a travelling wave such that less of the length of cable 440 is seated within channel 536. Because bend 442 travels along the length of cable 440 the strain associated with bending is distributed over a portion of the length of cable 440 rather than being concentrated at single position thereof, significantly decreasing the potential for failure. In the illustrated embodiment, edge 518*a* of second guide 518 does not contact and/or apply force to bend 442 at any point in the rotation of rotatable member 510.

Connector system 500 further includes a cover 550. One function of cover 550 is to assist in maintaining cable 440 in an arced or partially coiled form as illustrated in FIGS. 2 through 7 around generally cylindrical section 520. In that regard, cable 440 can, for example, be restrained in position by a crimping, compressive or holding action exerted by first guide 516. An inner wall of cover 550 operates to further constrain cable 440 in position along second guide 518 and around generally cylindrical section 520. Another function of cover 550 is to encompass cable 440 and provide protection against environmental hazards, including snagging or catching on obstacles.

Figure 7:
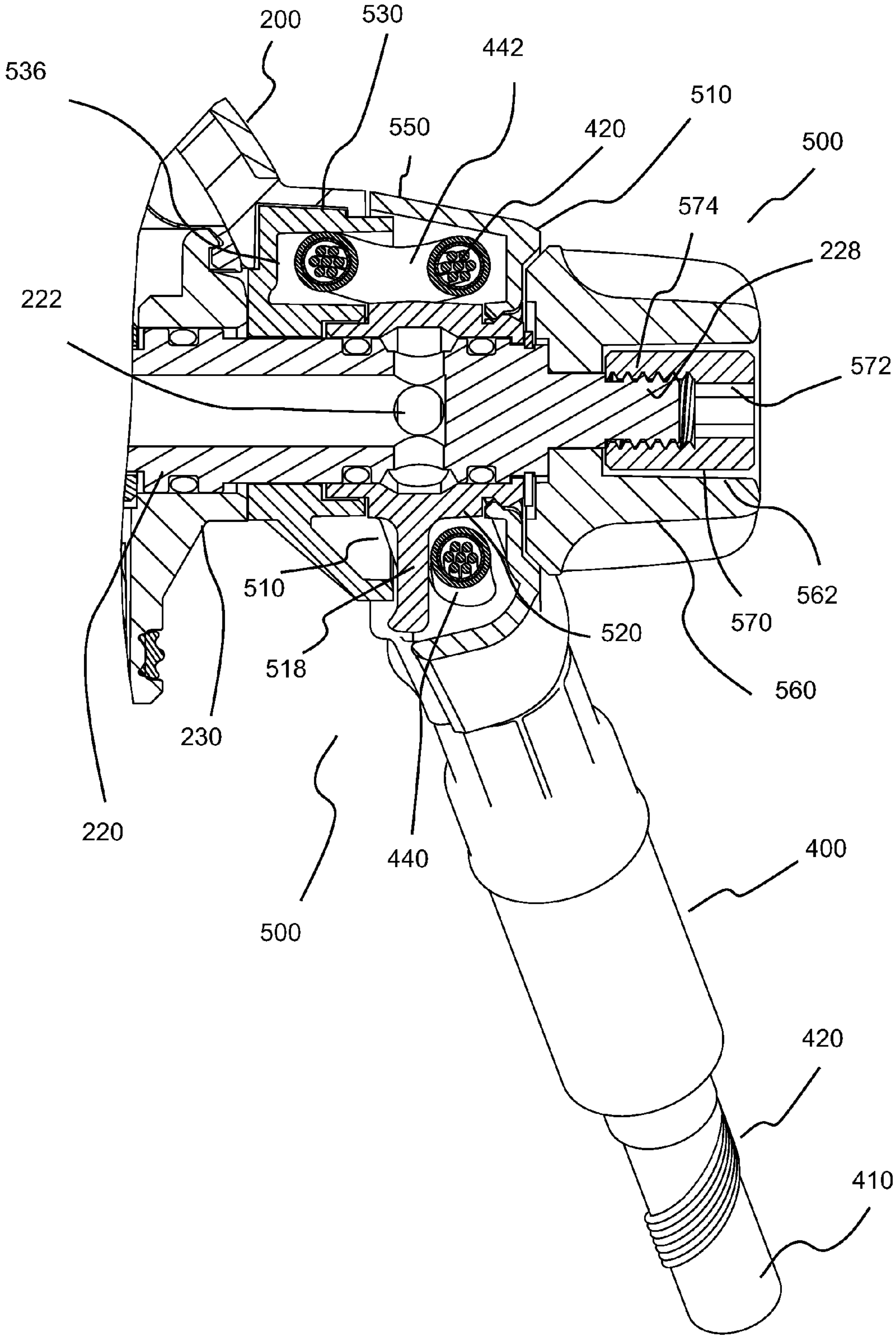
FIG. 7 illustrates a cross sectional view of the connector system in connection with the second stage regulator.

In the illustrated embodiment, cover 550 includes a passage 552 through which shaft 220 passes to cooperate with an end member or knob 560 and a retaining connector in the form of a nut 570. End member 560 includes a passage 562 through which shaft 220 passes to form a retaining connection with retaining connector 570. As illustrated in FIG. 7, retaining connector 570 can, for example, include threading 574 along an interior of a passage 572 thereof which cooperates with threading 228 on shaft 220.

Connector system 500 thus contains cable 440 internally therein to provide protection against catching, snagging, and other types of environmental damage to cable 440. The rotatable mechanism or system of connector system 500, further provides additional strain relief to cable 440. Advantages of connector system 500 over existing systems in which a cable is passed into, are for example, a second stage regulator include greater ease of assembly, improved strain relief, elimination of snagging or catching hazards, hiding the cable from sight, decreased potential for damage to the cable, reduced repair cost, and greater customer satisfaction.

Although the connectors systems hereof have been described in connection with a representative embodiment of connection to a second stage regulator of a respirator system, the connector systems hereof can be used to rotatably or swivelably connect a cable or cables to many different types of items.

The foregoing description and accompanying drawings set forth embodiments at the present time. Various modifications, additions and alternative designs will, of course, become apparent to those skilled in the art in light of the foregoing teachings without departing from the scope hereof, which is indicated by the following claims rather than by the foregoing description. All changes and variations that fall within the meaning and range of equivalency of the claims are to be embraced within their scope.

What is claimed is:

1. A respirator system, comprising:

a regulator for use in connection with a facepiece of the respirator system, the regulator including an interface;

a hose assembly comprising a hose for carrying breathing gas to the regulator and a cable having a length for carrying at least one electrical wire to the regulator; and a connector system, comprising:

a base operatively connectible to the interface of the regulator, the base comprising a channel to seat at least a portion of the cable, the channel being in operative connection with an interior of the regulator upon connection of the base to the interface; and a rotatable member which is rotatable relative to the base, the cable being in operative connection with the rotatable member so that, as the rotating member rotates relative to the base, a bend in the cable is formed at different locations in the length of the cable such that the different locations define different lengths of the cable, wherein the different lengths of the cable become positioned with in the channel as the rotating member rotates relative to the base.

2. The system of claim 1 wherein the regulator comprises a shaft extending from the interface, the shaft comprising a passage therein via which breathing gas can enter the regulator, the base comprising a passage through which the shaft passes, the rotatable member comprising a passage through which the shaft passes so that the rotatable member is rotatable about an axis of the shaft to rotate relative to the base.

3. The system of claim 2 wherein the rotating member comprises a port adapted to be placed in fluid connection with the hose, the port further being adapted to be placed in fluid connection with at least one port formed in the shaft to place the hose in fluid connection with the passage in the shaft.

4. The system of claim 2 wherein the connector system further comprises a cover attachable to the rotating member to encompass the cable.

5. The system of claim 4 wherein the cable is fixed to the rotatable member and travels around at least a portion of a generally cylindrical member of the rotatable member in which the passage of the rotatable member through which the shaft passes is formed, the cover being adapted to constrain movement of the cable.

6. The system of claim 5 wherein the rotating member comprises a port adapted to be placed in fluid connection with the hose, the port further being adapted to be placed in fluid connection with at least one port formed in the shaft to place the hose in fluid connection with the passage in the shaft.

7. The system of claim 5 wherein the cable is held in an arced conformation around the at least a portion of the rotating member by the cover.

8. The system of claim 7 wherein the rotating member comprises a flange extending outwardly over at least a portion thereof to constrain movement of the cable, the flange being positioned between the cable and the channel.

9. The system of claim 8 wherein the flange does not contact the bend in the cable.

10. A method of managing a cable having a length in a respirator system including a regulator including an interface, a facepiece and a hose assembly including a hose for carrying breathing gas to the regulator and the cable, wherein the cable is adapted to carry at least one electrical wire to the regulator, comprising:

connecting a connector system to the interface of the regulator, the connector system comprising a base operatively connectible to the interface of the regulator, the base comprising a channel to seat at least a portion of the cable, the channel being in operative connection with an interior of the regulator upon connection of the base to the interface; and a rotatable member which is rotatable relative to the base, and placing the cable in operative connection with the rotatable member so that, as the rotating member rotates relative to the base, a bend in the cable is formed at different locations in the length of the cable such that the different locations define different lengths of the cable, wherein the different lengths of the cable become positioned within the channel as the rotating member rotates relative to the base.

* * * * *